United States Patent Office 3,157,678
Patented Nov. 17, 1964

3,157,678
METHOD OF PRODUCING A CRYSTALLINE ESTER OF VITAMIN $D_3$ AND CRYSTALLINE VITAMIN $D_3$ WHICH MAY BE OBTAINED THEREFROM
Menso Pieter Rappoldt, Weesp, Netherlands, assignor to North American Philips Company, Inc., New York, N.Y., a corporation of Delaware
No Drawing. Filed July 8, 1960, Ser. No. 41,470
Claims priority, application Netherlands Aug. 4, 1959
2 Claims. (Cl. 260—397.2)

This invention relates to methods of producing crystalline vitamin $D_3$.

It is known that the separation of the crystalline vitamin $D_3$ from the irradiation product of 7-dehydrocholesterol is difficult. After concentration of the solution of the irradiation product a syrup is obtained from which the vitamin $D_3$ does not crystallize out even after inoculation.

Known methods to separate the vitamin $D_3$ from the irradiation product are based on the fact that a number of esters of the vitamin $D_3$ can be more readily crystallized. For this esterification use may be made of various acids, for example allophanic acid, several nitro- and dinitrobenzoic acids, nitro- and dinitromethylbenzoic acids and p-methoxy-benzoic acid.

Although according to these methods crystallized esters can be separated from the irradiation product, it is not possible to obtain crystalline vitamin $D_3$ directly after saponification of these esters, for these esters consist of mixtures of esters of vitamin $D_3$ and of sterols from the irradiation mixture. The presence of these sterols is an important disadvantage for two reasons. Firstly, it is found that after saponification of the ester-mixture, the sterols prevent crystallization of the vitamin $D_3$, even if they are present in very slight amounts. Secondly, the manufacturer of vitamin $D_3$ is required to produce a vitamin $D_3$ which does not provide any turbidity in a solution after the addition of digitonin. Very slight amounts of 7-dehydrocholesterol and cholesterol which have not been converted into vitamin $D_3$—and which hereinafter will be referred to as "sterols"—when mixed with the vitamin $D_3$ give rise to a marked turbidity with digitonin and thus materially reduce the value of the product.

Separation of the acid esters of vitamin $D_3$ from these sterol esters has proved very difficult and unsuitable for industrial manufacture. Since these sterol esters are less readily soluble than the vitamin $D_3$ esters, a sufficiently pure vitamin $D_3$ ester can only be obtained after repeated crystallization with a resultant low yield.

Another known manner used in the industry is one in which the irradiation product is converted into the 3,5-dinitro-benzoate which is separated off in crystalline form. The resultant ester mixture is then saponified and digitonin is added to a solution of the mixture of alcohols obtained. The digitonin sterol reaction compound is filtered off as a precipitate, after which, but only if very expensive highly pure digitonin is used, crystalline vitamin $D_3$ is obtainable from the mother liquor.

A principal objects of this invention therefore is to obtain digitonizable sterol free crystalline vitamin $D_3$ from the irradiation product of 7-dehydro cholesterol in a more efficient manner.

This and other objects of the invention will be apparent from the description that follows:

According to the invention digitonizable sterol free crystalline vitamin $D_3$ is produced from the irradiation product of 7-dehydrocholesterol by converting said irradiation product into the n-butyl ester thereof containing less than 8% by weight of esters of digitonizable sterols, removing the n-butyl esters of the digitonizable sterols by a single recrystallization and then converting the resultant crystalline vitamin $D_3$ butyrate to vitamin $D_3$ by reduction or saponification.

Many ways of producing the vitamin $D_3$ butyrate are known.

In the Netherlands patent specification 83,563, for example, the production of the butyric acid ester of vitamin $D_3$ is described.

The esterification may be carried out according to usual methods, for example by reacting the irradiation product with the acid anhydride or the acid chloride. After the esterification reaction, the crude ester mixture is separated off either by inoculating the reaction mixture with vitamin $D_3$ butyrate, or by adding water to the reaction mixture, extracting the obtained mixture with an organic low boiling point solvent, for example an ether, such as dimethyl-, di-isopropyl- or methyl-isopropylether, aliphatic hydrocarbons, for example petroleum ether, aromatic hydrocarbons, for example toluene, benzene, by washing this extract in sequence with water, a dilute inorganic acid, for example sulphuric acid, water, a dilute alkaline aqueous solution, for example a solution of sodium bicarbonate, and twice with water, and subsequently drying it, for example over dry sodium sulphate, and, if required, after concentration and inoculation of this extract, crystallizing out the crude ester.

For the recrystallization of the ester, various solvents may be used, such as lower aliphatic ethers, for example diethylether or di-isopropylether, cyclic ethers such as dioxan, tetrahydrofuran, esters of lower aliphatic alcohols and carbonic acids, for example ethylacetate or isobutylacetate, lower aliphatic alcohols, for example ethanol, propanol, isobutylalcohol, or ketones, for example acetone, methylethylketone or methylisobutylketone, or mixtures of these solvents.

The crude ester is dissolved in the solvent by heating and crystallizes out at a low temperature between room temperature and $-10°$ C.

Alternatively, the crude ester may be absorbed in a solvent in which its solubility is very high, for example in one of the said ketones or esters, if required, while heating, after which there is added to this solution another solvent in which the ester is far less readily soluble, for example an alcohol, the pure ester crystallizing from the mixture again at a temperature between room temperature and $-10°$ C.

In order to obtain the crystalline vitamin $D_3$, the pure ester is saponified under alkaline conditions in a usual manner, for example by adding the ester or a solution thereof to an alcoholic alkaline solution for example a solution of NaOH or KOH in ethanol or methanol, or by adding an alcoholic alkaline solution to a solution of the ester. This saponification reaction is preferably carried out at a temperature between 0° C. and 50° C.

The crystalline vitamin $D_3$ can be separated from the saponification mixture in a variety of manners.

The saponification mixture may be inoculated with vitamin $D_3$ so that the vitamin $D_3$ crystallizes immediately, as the case may be during the saponification reaction. According to another method, after completion of the saponification reaction water is added to the mixture, which is then extracted with a non-water-miscible organic solvent, for example an ether or petroleum ether. This extract is washed in sequence with a dilute inorganic acid, for example sulphuric acid or hydrochloric acid, water, a dilute aqueous alkaline solution, for example a dilute solution of $NaHCO_3$, and twice with water.

Then the extract is dried, for example over dry $Na_2SO_4$, and subsequently, after the extract may have been concentrated and dissolved in another solvent and again inoculated, the vitamin $D_3$ crystallizes out.

Another means to obtain the crystalline vitamin $D_3$ from the pure butyrate consists in the reduction of the vitamin $D_3$ butyrate with the aid of a metal hydride containing two different metal atoms, for example $LiAlH_4$, or with the aid of a metal alkylhydride, for example diisobutylaluminumhydride.

This reduction can be carried out in the usual manner, for example by adding a solution of vitamin $D_3$ butyrate in ether to a solution or a suspension of $LiAlH_4$ in ether, for example in diethylether, dioxane or tetrahydrofurane, any excess or reduction agent and the produced metal additive compound being decomposed, for example by the addition of ethylacetate.

If required, a non-water miscible organic solvent, for example diethylether or petroleumether may be added, the solution being washed, for example, in sequence with a dilute aqueous solution of sulphuric acid, water, a dilute aqueous sodium bicarbonate solution and water, then the solution is dried, for example with the aid of $Na_2SO_4$, the solvent is evaporated and the residue is crystallized from a suitable solvent, for example from acetone.

The invention will now be described in greater detail with reference to the following examples.

EXAMPLE I

*Purification by crystallization of the vitamin $D_3$ butyrate.*—19.8 gm. of crude vitamin $D_3$ btuyrate containing 2.1% of sterolbutyrate were crystallized from a mixture of 400 cc. of acetone and 35 cc. of methanol. After standing overnight at room temperature, 14.31 gm. of vitamin $D_3$ btuyrate containing no sterols were separated, that is a yield of 72%, having a melting point of 62.5–64° C. This butyrate gave no precipitate with digitonin on saponification.

EXAMPLE II

*Purification by crystallization of the vitamin $D_3$ butyrate.*—200 gm. of vitamin $D_3$ butyrate containing 0.7% of sterol butyrate were dissolved in 500 cc. of acetone and 300 cc. of ethanol. After standing for 24 hours at $-2°$ C., 190 gm. of pure vitamin $D_3$ butyrate were separated, which gave no precipitate with digitonin on saponification.

EXAMPLE III

*Saponification of vitamin $D_3$ butyrate.*—14.3 gm. of pure crystalline vitamin $D_3$ butyrate dissolved in 14 cc. of acetone were added to a solution of 3.6 gm. of KOH in 58 cc. of methanol.

After inoculation of the reaction mixture with vitamin $D_3$ crystals and after standing overnight, 7.7 gm. of vitamin $D_3$ crystallized out (that is a yield of 63%), having a melting point of 84–85° C.

EXAMPLE IV

*Saponification of vitamin $D_3$ butyrate.*—50 gm. of pure crystalline vitamin $D_3$ butyrate were dissolved by heating in a solution of 15 gm. of KOH in 200 ccs. of ethanol. On completion of the dissolving process, the mixture was cooled to room temperature and stored at this temperature overnight.

Then 200 cc. of water were added and the mixture was extracted thrice with petroleum ether. The collected extracts were washed in sequence with dilute sulphuric acid, water, a solution of $NaHCO_3$ and twice with water. The petroleum ether solution was then dried over $Na_2SO_4$ and the solvent evaporated under reduced pressure.

The residue was absorbed in 90 ccs. of acetone, 24.8 gm. of vitamin $D_3$ having a melting point of 84.5–85.4° C. crystallizing from this solution at 0° C. The yield was 58.8% calculated with respect to the ester.

EXAMPLE V

*Reduction of vitamin $D_3$ butyrate.*—A solution of 20 gm. of vitamin $D_3$ butyrate in 50 ml. of dry ether was slowly added to the stirred suspension of 1.75 gm. of $LiAlH_4$ in 50 ml. of ether at 0°. Then the temperature was raised to 20° and 4 ml. of ethyl acetate and subsequently of 50 ml. of $2N\ H_2SO_4$ were slowly added.

The ether layer was separated off and washed in sequence with $2N\ H_2SO_4$, dilute $NaHCO_3$ and water. After drying the solution over dry $Na_2SO_4$, the ether was evaporated and the residue was dissolved in 40 ml. of acetone.

After one night at $-5°$ the crystallizate was drawn off and the mother liquor, after evaporation, again crystallized. Thus, 12.2 gm. (74%) of vitamin $D_3$ were obtained in three crystallization processes.

While we have described our invention in connection with specific embodiments and applications, other modifications thereof will be readily apparent to those skilled in this art without departing from the spirit and scope of the invention as defined in the appended claims.

What I claim is:

1. A method of producing a cholesterol and 7-dehydrocholesterol free crystalline vitamin $D_3$ which comprises the steps of crystallizing, in a single step, vitamin $D_3$ butyrate from a solution of said butyrate containing less than 8% of the butyrates of said cholesterol and said 7-dehydrocholesterol, treating the vitamin $D_3$ butyrate with a metal hydride selected from the group consisting of metal hydrides of two different metals and metal alkyl hydride to thereby form vitamin $D_3$ and then, without the addition of digitonin, separating out pure crystalline vitamin $D_3$ by crystallization.

2. A method of producing a cholesterol and 7-dehydrocholesterol free crystalline vitamin $D_3$ which comprises the steps of crystallizing, in a single step, vitamin $D_3$ butyrate from a solution of said butyrate containing less than 8% of the butyrates of said cholesterol and said 7-dehydrocholesterol, treating the vitamin $D_3$ butyrate with $LiAlH_4$ to thereby form vitamin $D_3$ and then, without the addition of digitonin, separating out pure crystalline vitamin $D_3$ by crystallization.

References Cited in the file of this patent

UNITED STATES PATENTS 2,942,009    Westerhof _____ June 21, 1960

FOREIGN PATENTS 614,151    Great Britain _____ Dec. 9, 1948
730,245    Great Britain _____ May 18, 1955